United States Patent [19]

Sugiyama et al.

[11] 4,089,798
[45] May 16, 1978

[54] PROCESS FOR PRODUCING REDUCING GAS

[75] Inventors: Hiroshi Sugiyama; Kuniki Yoshitake; Nobuhiko Sakata; Taizo Sugioka; Nobuhisa Mizuno, all of Sodegaura, Japan

[73] Assignee: Idemitsu Kosan Company, Ltd., Tokyo, Japan

[21] Appl. No.: 705,922

[22] Filed: Jul. 16, 1976

[30] Foreign Application Priority Data

Jul. 25, 1975   Japan .................................. 50-90783

[51] Int. Cl.² .......................... C01B 2/16; C10G 11/28
[52] U.S. Cl. ....................................... 252/188; 23/281; 48/197 R; 75/34; 208/120; 208/121; 252/373
[58] Field of Search ............ 252/188, 373; 48/197 R; 23/281; 75/34; 208/120, 121

[56] References Cited

U.S. PATENT DOCUMENTS

| | | | |
|---|---|---|---|
| 3,709,669 | 1/1973 | Marion et al. | 252/373 |
| 3,838,994 | 10/1974 | Aldridge | 252/373 |
| 3,852,405 | 12/1974 | Granquist | 208/120 |
| 3,909,446 | 12/1975 | Miyashita et al. | 252/188 |
| 3,928,000 | 12/1975 | Child et al. | 252/373 |
| 3,957,962 | 5/1976 | Ramsbotham | 252/373 |

Primary Examiner—Benjamin R. Padgett
Assistant Examiner—Irwin Gluck
Attorney, Agent, or Firm—Flynn & Frishauf

[57] ABSTRACT

Reducing gas of low $CH_4$ content is produced by cracking a heavy hydrocarbon having a C/H atomic ratio of more than one at 800°–950° C. in the presence of a catalyst comprising at least one metal selected from K, Ni, Co and Mo or at least oxide of said metal, associated with alumina or a silica-alumina composite.

13 Claims, 1 Drawing Figure

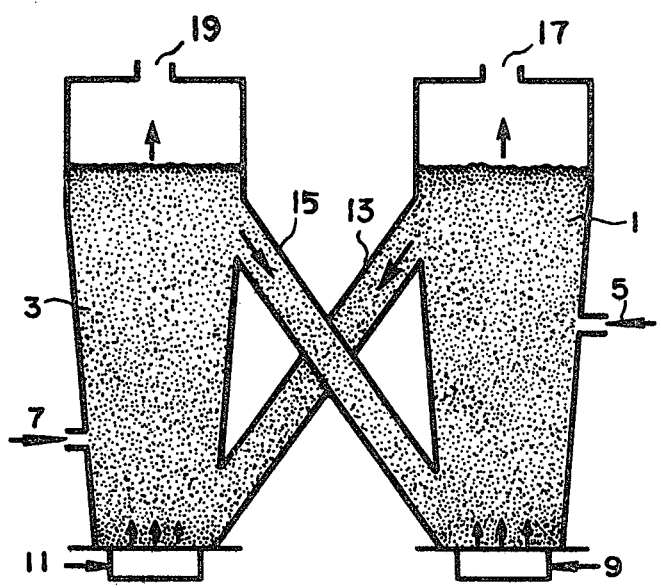

PROCESS FOR PRODUCING REDUCING GAS

FIELD OF THE INVENTION

This invention relates to a process for producing gas which has low methane content by cracking carbon-rich heavy hydrocarbon. More particularly, it relates to a process for producing gas for reduction by cracking carbon-rich heavy hydrocarbon in the presence of a novel catalyst.

BACKGROUND OF THE INVENTION

Heretofore, a naphtha steam reforming process and a partial oxidizing process of residual oil, etc., have been known as processes for producing gas low in methane content. However, the former utilizes materials of high cost and cannot utilize a poor quality fuel such as cokes; and the latter has disadvantages in that it has an inherent danger due to using an oxidizing agent such as oxygen, and materials extensively rich in carbon content cannot be utilized.

SUMMARY OF THE INVENTION

We have conducted research to develop an efficient process for producing gas of low methane content suitable for iron manufacture, for example, from carbon-rich heavy hydrocarbons, and to overcome the above-described disadvantages. We have found that these objects can be achieved by using a catalyst which comprises at least one metal selected from the group consisting of potassium, nickel, cobalt and molybdenum or at least one oxide of said metals, supported on alumina or a silica-alumina composite, under specified conditions. The catalyst can also comprise mixtures of one or more of said metals and one or more of said oxides.

BRIEF DESCRIPTION OF THE DRAWING

The FIGURE shows a cross-sectional view of a fluidized-bed system recycling in two towers, i.e., reactor 1 and tower 3 for regenerating catalyst. In the FIGURE, 5 is an inlet for feeding of starting material (heavy hydrocarbon); 7 is an inlet for introducing air for regenerating catalyst; and 9 and 11 are inlets for introducing steam. Conduit 13 is for passing used catalyst from reactor 1 to regenerator 3, and conduit 15 is for passing regenerated catalyst from regenerator 3 to reactor 1. Product gas is removed from tower 1 through outlet 17. Gases from regenerator 3 are removed therefrom through outlet 19.

SPECIFIC EMBODIMENS OF THE INVENTION

The present invention provides a process for producing reducing gas which comprises cracking a heavy hydrocarbon in which the atomic ratio of carbon to hydrogen is more than one, at a temperature of 800°–950° C. in the presence of said catalyst.

Heavy hydrocarbons of high carbon content utilized as a starting material in the present invention are those in which the atomic ratio of carbon to hydrogen is more than 1. Typical examples are highly extracted fractions of propane deasphalted asphalt, crude oils, light oils, residual oils after cracking such as heavy oils and mixtures of propane deasphalted asphalt and cracked pitch.

The present process involves use of an alumina or silica-alumina catalyst on which at least one metal selected from the group consisting of potassium, nickel, cobalt and molybdenum or at least one oxide of said metals is supported. In this case, the metal or metal oxide is preferably supported on the carrier in an amount of from 4 to 20 weight percent, calculated as metal. When the amount is less than 4 weight percent, the desired effect cannot be achieved, and when the amount is more than 20 weight percent, the mechanical strength of the catalyst is deteriorated extensively in use.

The catalyst can be prepared by adding a required amount of metal or metal oxide in the form of powder to a support. Alternatively, the support is impregnated with a solution containing the metal or metal oxide, as in the form of a metal salt, and then dried. The catalyst is then made into tablet or pillar-shape form, and then calcined at a higher temperature than 400° C., preferably higher than 800° C.

The shape of the catalyst is not critical; however, tablets of 35–60 mesh are preferable for a fluidized-bed process.

The present invention can be performed by either a conventional fixed-bed process or a fluidized-bed process. Preferred conditions are as follows; cracking temperature is 800°–950° C., particularly 850°–900° C.; time for contacting hydrocarbon feed and catalyst is less than 10 seconds, particularly about 1 second; ratio of steam to hydrocarbon (by weight) is 0.5–5.0, and pressure is from atmospheric pressure to 10 kg/cm$^2$.

According to the present invention, gas of very low content of methane (less than 3% by volume) can be obtained by the use of only one fluidized-bed and this invention has the advantage that hydrocarbon feeds of low quality such as cokes can be used. Furthermore, when a fluidized-bed process is employed, this invention has the advantage that dispersion of the starting material during the reaction can be kept in good state by performing concurrent regeneration of the used catalyst with air.

Therefore, the present invention is preferably practiced for the production of gas for iron manufacture, hydrogen gas, starting gas for chemical syntheses and fuel gas.

The present invention is described in detail by the following examples.

EXAMPLES 1–4

Pitch (A) of residual carbon content of 57.8% obtained by cracking vacuum residual oil from Kuwait, at a temperature of 700° C. using CaO-Al$_2$O$_3$, and propane deasphalted asphalt (B) of residual carbon content of 26.7% and a softening point of 68° C., were mixed in various ratios. The resulting mixtures were used as the hydrocarbon feed. Each mixture was cracked by use of a fluidized-bed system recycling in two towers as shown in the FIGURE, using as the catalyst: K$_2$O-Al$_2$O$_3$ containing 15 weight percent of K$_2$O (calculated as potassium); Ni-SiO$_2$-Al$_2$O$_3$ containing 5.2 weight percent of nickel; or Co-Mo-SiO$_2$-Al$_2$O$_3$ containing 6.8 weight percent of cobalt; and the same amount of molybdenum. The amount of the catalyst was 17 kg. Ratio (by weight) of steam to hydrocarbon was 3. Hydrocarbon feed rate was 500 g/hr. Other conditions included: reaction temperature, 850° C.; pressure, 1 kg/cm$^2$; and contact period, 1.0 second. Results are shown in Table 1.

COMPARATIVE EXAMPLES 1 AND 2

For a comparative study, experiments with carbon-poor starting material (C/H is less than 1.0) and with sand as the catalyst were also performed. Results are also shown in Table 1.

EXAMPLES 5-9

Experiments similar to those described in Examples 1-4 were carried out, except that the catalyst, C/H atomic ratio and reaction temperature were changed. Results are shown in Table 2.

residue and a mixture of a propane deasphalted asphalt and a cracked pitch.

3. A process according to claim 1, wherein said catalyst is a catalyst comprising metal or metal oxide in an amount of from 4 to 20 weight percent calculated as metal.

4. A process according to claim 1, wherein the hydrocarbon and catalyst are contacted for a period of time of less than 10 seconds.

Table 1

| | | Example | | | | Comparative Example | |
|---|---|---|---|---|---|---|---|
| | | 1 | 2 | 3 | 4 | 1 | 2 |
| Starting Oil B/A(wt/wt) | | 25/75 | 0/100 | 25/75 | 25/75 | 25/75 | 50/50 |
| C/H Atomic Ratio of Starting Oil | | 1.20 | 1.59 | 1.20 | 1.20 | 1.20 | 0.97 |
| Catalyst | | **$K_2O$-$Al_2O_3$ | **$K_2O$-$Al_2O_3$ | ***Co Mo-$SiO_2$-$Al_2O_3$ | ***Ni-$SiO_2$-$Al_2O_3$ | Sand | $K_2O$-$Al_2O_3$ |
| Yield | Gasification of Carbon (wt %) | 84.3 | 78.2 | 63.0 | 62.4 | 47.4 | 95.4 |
| | Amount of Gas produced ($Nm^3$;kg-oil) | 3.79 | 3.62 | 3.02 | 2.98 | 1.78 | 3.93 |
| | Carbon produced (wt %) | 13.6 | 18.3 | 26.0 | 27.0 | 35.6 | 4.3 |
| Composition of Gas produced (Vol %) | $CH_4$ | 2.1(2.7)* | 1.1(1.4) | 2.2(2.9) | 2.2(2.9) | 5.2(6.7) | 3.6(4.6) |
| | $C_2H_2$ | 0.2(0.0) | 0.3(0.0) | 0.2(0.0) | 0.2(0.0) | 0.0(0.0) | 0.1(0.0) |
| | $C_2H_4$ | 0.5(0.0) | 0.0 | 0.1(0.0) | 0.2(0.0) | 3.6(0.0) | 0.9(0.0) |
| | $C_2H_6$ | 0.0 | 0.0 | 0.0 | 0.0 | 0.7 | 0.0 |
| | $C_3H_6$ | 0.0 | 0.0 | 0.0 | 0.0 | 1.0 | 0.0 |
| | $C_3H_8$ | 0.0 | 0.0 | 0.0 | 0.0 | 0.1 | 0.0 |
| | 1.3-$C_4H_6$ | 0.0 | 0.0 | 0.0 | 0.0 | 0.3 | 0.0 |
| | $C_4H_8$ | 0.0 | 0.0 | 0.0 | 0.0 | 0.1 | 0.0 |
| | $H_2$ | 63.4(81.8) | 65.0(83.7) | 67.4(87.5) | 67.3(87.4) | 62.9(81.3) | 61.1(78.6) |
| | CO | 12.0(15.5) | 11.6(14.9) | 7.4(9.6) | 7.5(9.4) | 9.3(12.0) | 13.0(16.7) |
| | $CO_2$ | 20.5(0.0) | 20.6(0.0) | 20.9(0.0) | 20.8(0.0) | 15.1(0.0) | 20.3(0.0) |
| | $H_2S$ | 1.2(0.0) | 1.4(0.0) | 1.8(0.0) | 1.8(0.0) | 1.6(0.0) | 1.0(0.0) |

*Numerical value in parenthesis shows volume percent based on the total amount of methane, hydrogen and carbon monoxide.
**Forming β-alumina powder into a tablet (10 mm in diameter and 6 mm in height) and calcining it at 1500° C.
***Prepared by the impregnation method and calcined at 850° C.

Table 2

| | | Example | | | | |
|---|---|---|---|---|---|---|
| | | 5 | 6 | 7 | 8 | 9 |
| Starting Oil B/A (wt./wt.) | | 25/75 | 10/90 | 25/75 | 10/90 | 10/90 |
| C/H Atomic Ratio of Starting Oil | | 1.20 | 1.43 | 1.20 | 1.40 | 1.40 |
| Catalyst | | *(5) $K_2O$-$Al_2O_3$ | (10) $K_2O$-$Al_2O_3$ | (20) $K_2O$-$Al_2O_3$ | (10) Ni-$Al_2O_3$ | (10) Co, Mo-$Al_2O_3$ |
| Temperature (° C) | | 950 | 900 | 800 | 900 | 900 |
| Yield | Gasification of Carbon (wt %) | 84.5 | 58.9 | 64.4 | 54.0 | 53.5 |
| | Amount of Gas produced ($Nm^3$/kg-oil) | 4.01 | 3.12 | 3.08 | 2.47 | 2.61 |
| | Carbon produced (wt %) | 0.8 | 21.4 | 15.3 | 32.6 | 30.7 |
| Composition of Gas produced (Vol %) | $CH_4$ | 1.2(1.4) | 1.4(1.6) | 2.6(3.3) | 1.7(2.0) | 1.9(2.2) |
| | $C_2H_2$ | 0.6(0.0) | 0.2(0.0) | 0.0 | 0.3(0.0) | 0.2(0.0) |
| | $C_2H_4$ | 0.2(0.0) | 0.3(0.0) | 1.0(0.0) | 0.5(0.0) | 0.4(0.0) |
| | $C_2H_6$ | 0.0 | 0.0 | 0.0 | 0.0 | 0.0 |
| | $C_3H_6$ | 0.0 | 0.0 | 0.1(0.0) | 0.0 | 0.0 |
| | $C_3H_8$ | 0.0 | 0.0 | 0.0 | 0.0 | 0.0 |
| | 1.3-$C_4H_6$ | 0.0 | 0.0 | 0.0 | 0.0 | 0.0 |
| | $C_4H_8$ | 0.0 | 0.0 | 0.0 | 0.0 | 0.0 |
| | $H_2$ | 65.5(76.2) | 68.7(79.8) | 65.9(84.9) | 64.3(76.0) | 66.2(78.4) |
| | CO | 19.3(22.4) | 16.0(18.6) | 9.2(11.8) | 18.6(22.0) | 16.4(19.4) |
| | $CO_2$ | 12.1(0.0) | 11.6(0.0) | 19.8(0.0) | 12.8(0.0) | 13.0(0.0) |
| | $H_2S$ | 1.1(0.0) | 1.8(0.0) | 1.4(0.0) | 1.8(0.0) | 1.9(0.0) |

*Numerical value in parenthesis shows the rate of metal or metal oxide carried (weight percent calculated as metal).

What is claimed is:

1. A process for producing a reducing gas containing less than 3 percent by volume of methane, which comprises heating a reaction charge consisting essentially of a heavy hydrocarbon having an atomic ratio of carbon to hydrogen of more than one and steam at a temperature of from 800° to 950° C. in the presence of a catalyst comprising at least one metal selected from the group consisting of potassium, nickel, cobalt and molybdenum or at least one oxide of said metals, supported on alumina or a silica-alumina composite, the weight ratio of steam to the heavy hydrocarbon being from 0.5 to 5.

2. A process according to claim 1, wherein said heavy hydrocarbon is a hydrocarbon selected from the group consisting of a highly extracted fraction of propane deasphalted asphalt, a crude oil, a light oil, a cracked 5. A process according to claim 1, wherein the pressure is from atmospheric pressure to 10 kg/cm².

6. The process according to claim 1, wherein the catalyst comprises $K_2O$-$Al_2O_3$.

7. The process according to claim 1, wherein the catalyst comprises Ni-$Al_2O_3$.

8. The process according to claim 1, wherein the catalyst comprises Co-Mo-$SiO_2$-$Al_2O_3$.

9. The process according to claim 1, wherein the catalyst comprises Ni-$SiO_2$-$Al_2O_3$.

10. The process according to claim 1, wherein the catalyst comprises Co-Mo-$Al_2O_3$.

11. A process according to claim 1, wherein the reducing gas comprises hydrogen as the major component thereof, carbon monoxide in substantial amount as the component of second largest percentage, and carbon dioxide in substantial amount as the component of next largest percentage.

12. A process according to claim 1, wherein the reducing gas comprises hydrogen as the major component thereof, carbon dioxide in substantial amount as the component of second largest percentage, and carbon monoxide in substantial amount as the component of next largest percentage.

13. A process according to claim 1, wherein the reducing gas comprises from about 63 to about 69 percent by weight of hydrogen, from about 7 to about 20 percent by weight of carbon monoxide, from about 11 to about 21 weight percent of carbon dioxide and from about 1 to less than 3 weight percent of methane.

* * * * *